Aug. 25, 1964    R. D. PAGE ETAL    3,145,407
WINDSHIELD WIPER

Filed Aug. 14, 1963    3 Sheets-Sheet 1

INVENTORS
RAYMOND D. PAGE and
FREDERICK R. WEYMOUTH JR.
BY

ATTORNEY.

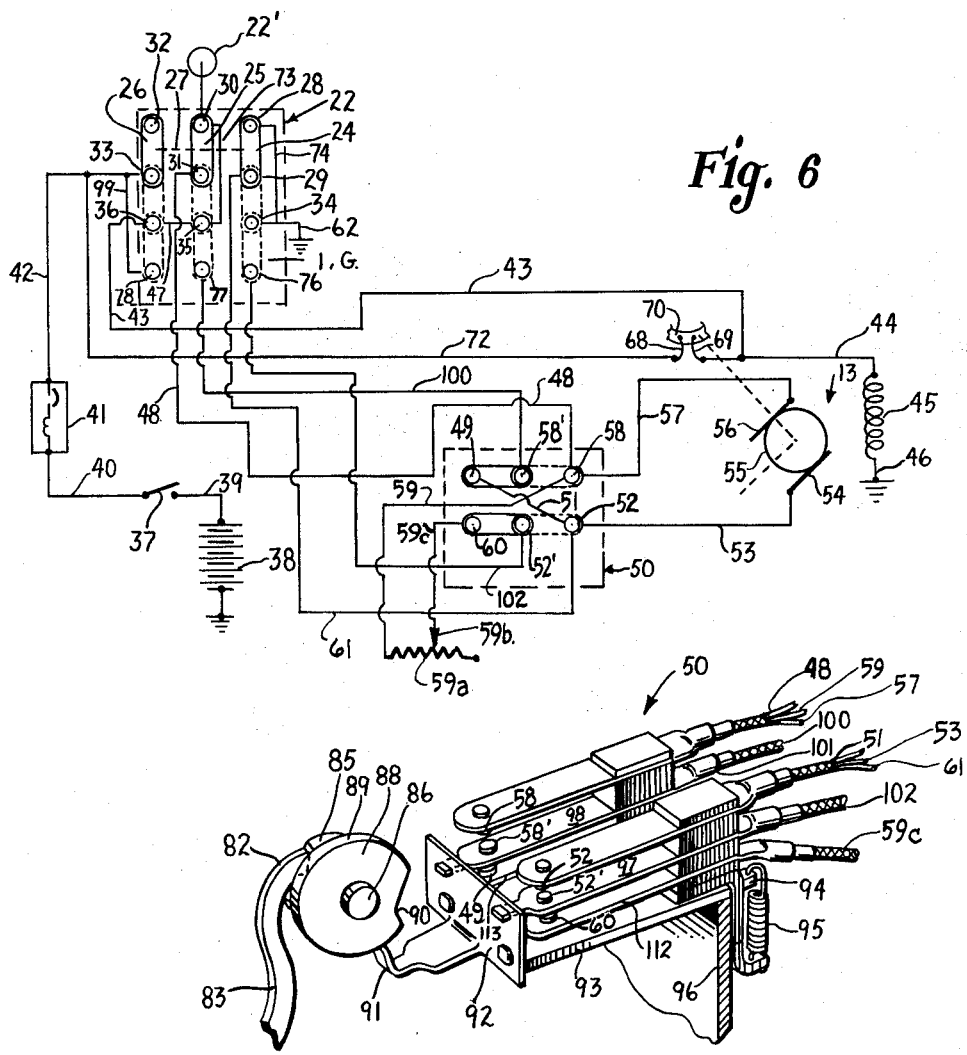

Aug. 25, 1964

R. D. PAGE ETAL 3,145,407

WINDSHIELD WIPER

Filed Aug. 14, 1963

INVENTOR.
RAYMOND D. PAGE and
FREDERICK R. WEYMOUTH JR.

BY

ATTORNEY.

United States Patent Office 3,145,407
Patented Aug. 25, 1964

3,145,407
WINDSHIELD WIPER
Raymond D. Page, Eggertsville, and Frederick R. Weymouth, Jr., Buffalo, N.Y., assignors to Trico Products Corporation, Buffalo, N.Y.
Filed Aug. 14, 1963, Ser. No. 302,020
12 Claims. (Cl. 15—250.12)

The present invention relates to an improved windshield wiper motor construction which can selectively provide continuous or intermittent wiper operation and, more particularly, to a wiper motor construction which is reversible to thereby drive the wipers when it rotates in a first direction and permits the wipers to dwell when it rotates in an opposite direction.

Due to varying windshield conditions, it is desirable to provide operator selectible dwell duration.

It is an object of the present invention to provide an improved windshield wiper motor construction which includes a highly simplified electro-mechanical construction for providing either continuous wiper operation or intermittent wiper operation with intervening dwell periods between successive cycles of wiper movement in an extremely simple manner utilizing either a single speed, a multi-speed or variable speed motor.

Another object of the present invention is to provide an improved windshield wiper motor construction which includes a simplified electro-mechanical construction for providing either continuous wiper operation or intermittent wiper operation with intervening dwell periods between successive cycles of wiper movement wherein the duration of the intervening dwell periods can be varied by the vehicle operator.

A further object of the invention is to provide an improved windshield wiper motor construction which includes an electro-mechanical construction for providing either continuous wiper operation or intermittent wiper operation and automatically provides continuous wiper operation during periods of vehicle acceleration.

Other objects and attendant advantages of the present invention will readily be perceived hereafter.

The present invention relates to an improved electric windshield wiper motor contruction having a one way clutch operatively interposed between the rotor driven shaft and the output shaft of the motor. Control circuits are associated with the motor to permit it to selectively provide continuous operation, as may be required, or to provide intermittent operation with an intervening dwell period between successive cycles of wiper movement, as may be desired during certain weather and traffic conditions. To obtain continuous operation, a main control switch is actuated to cause the electric motor to rotate in a first direction to thereby drive the output shaft through the one way clutch and thus transmit the motion produced by the electric wiper motor to the wipers on the windshield through an intermediate linkage. Whenever it is desired to provide intermittent operation, the main control switch associated with the wiper motor circuit is set to a secondary position. An eccentric is driven by the rotor shaft and a pawl is in turn driven by the eccentric. The pawl in turn indexes a ratchet. The ratchet in turn drives a cam which in turn has a follower associated therewith which causes the electric circuit to the motor to be periodically set up to provide rotation in said first direction or rotation in a second direction. When the rotation is effected in the first direction, the one way clutch will be engaged to thereby drive the output shaft of the motor and therefore drive the wipers, as described above. However, when the cam reaches a predetermined position, the follower will cause the circuit to the wiper motor itself to change to thereby reverse the polarity at the wiper motor. When this occurs the motor will reverse and the one way clutch will be ineffective for transmitting the motion from the rotor shaft to the output shaft of the motor. However, the rotor shaft will still rotate and the eccentric associated therewith will keep actuating the pawl and therefore turning the cam associated with the pawl until such time as the follower again causes the switch to reverse the polarity to the motor and cause it to drive in the first direction whereupon a cycle of wiper motor operation will be obtained. The foregoing structure is extremely simple and extremely efficient and thus can provide extremely dependable wiper motor operation either continuously or intermittently, as desired. The present invention will be more fully understood when the following portions of the specification are read in conjunction with the accompanying drawings wherein:

FIG. 5 is a perspective view of the reversing switch associated with the wiper motor;

FIG. 6 is a schematic electrical wiring diagram of the circuit used in conjunction with the wiper motor;

Figure 1:
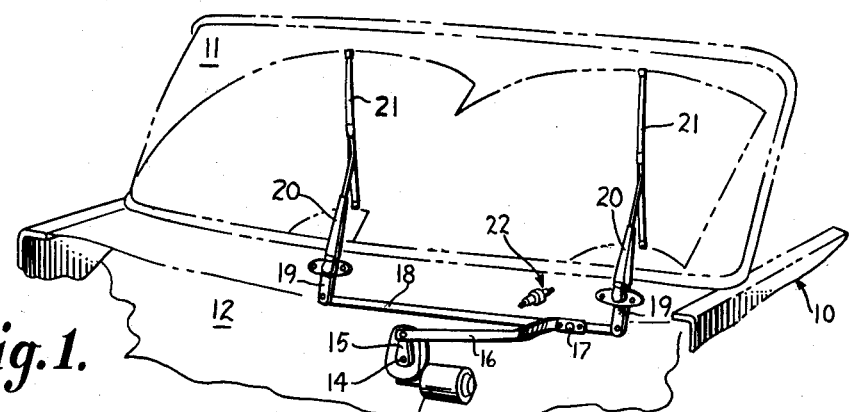
FIG. 1 is a fragmentary perspective view of an automotive vehicle mounting the improved wiper motor of the present invention.

In FIG. 1 an automotive vehicle 10 is shown having a windshield 11 mounted thereon in the conventional manner. Suitably secured to the fire wall 12 of the vehicle is the improved wiper motor 13 of the present invention. The motor may, of course, be of any suitable type capable of being reversed and although a single speed motor is shown, it will be understood that in accordance with the broader aspects of the invention, a multi-speed or variable speed motor may be utilized. The output shaft 14 of motor 13 has crank arm 15 keyed thereto. Pivotally secured to the end of crank arm 15 remote from its connection with shaft 14 is one end of elongated link 16, the other end of which is pivotally secured at 17 to link 18, the opposite ends of which are pivotally secured to the outer ends of crank arms 19 mounted on rockshafts (not shown) which are suitably journaled in the cowl of the vehicle. The ends of the rockshafts remote from their connection with crank arms 19 mount wiper arms 20 which in turn mount wipers 21. It will be appreciated that whenever wiper motor 13 is energized in a manner to cause movement of wipers 21, the latter will oscillate across the windshield to clear moisture therefrom. The energization of wiper motor 13 is effected by the manipulation of control or switch 22, which is suitably mounted on the dashboard and which is electrically connected to wiper motor 13 through electrical cable 23.

Wiper motor 13 can produce two distinct types of operation. The first type is conventional where the wiper motor operates continuously to drive the windshield wiper linkage continuously to thereby cause wipers 21 to oscillate continuously back and forth across the windshield to clear moisture therefrom. The foregoing type of operation is utilized during heavy precipitation. The other type of operation which wiper motor 13 can provide is an intermittent type of operation with an intervening dwell period between successive cycles of operation. This will cause the wipers 21 to operate intermittently with an intervening dwell period between successive cycles of operation. This type of operation is utilized when the windshield is subjected to moderate precipitation, thereby permitting sufficient moisture to accumulate on the windshield between successive cycles of wiper operation to provide lubrication for the wipers and also to prevent smear. The manner in which both of the foregoing types of operation are achieved will become more apparent hereafter.

Figure 2:
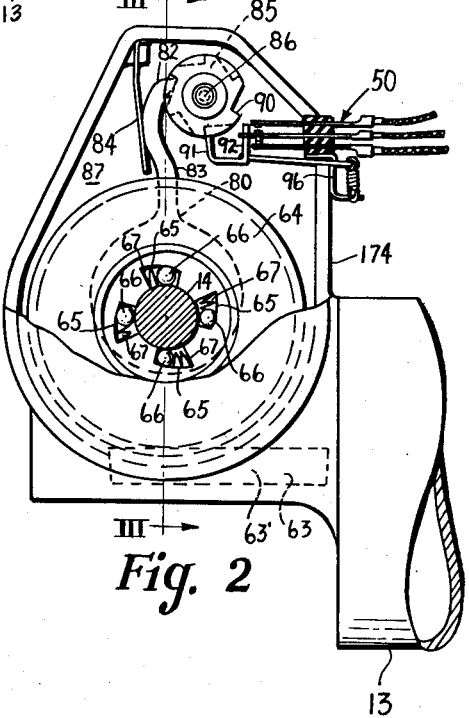
FIG. 2 is a fragmentary side elevational view of the improved wiper motor of the present invention with a portion of the cover broken away to reveal certain of the internal mechanical and electrical portions thereof.

When it is desired to have motor 13 drive wipers 21 continuously it is merely necessary to manipulate switch 22 (FIG. 6) to cause switch elements 24, 25 and 26, which are connected to each other by mechanical linkage 27 for movement in unison, to move from the parking position wherein switch elements 24, 25 and 26 bridge terminals 28–29, 30–31, and 32–33, respectively, to a position wherein said switch elements 24, 25 and 26 bridge terminals 29–34, 31–35 and 33–36, respectively. Assuming that ignition switch 37 is closed and one side of battery 38 is grounded, a circuit will be completed from battery 38 through lead 39, ignition switch 37, lead 40, circuit breaker 41, lead 42, terminal 33, switch element 26, lead 43, lead 44, field winding 45 of motor 13, and lead 46 to ground. Furthermore, a circuit will be completed through the armature or rotor 55 of motor 13 from contact 36, which is connected to the battery 38 through the above described electrical path, through lead 47, contact 35, switch element 25, contact 31, lead 48, the terminal of contact 58 on reversing switch 50 (which will be described in detail hereafter), lead 57, motor brush 56, armature 55, brush 54, lead 53, terminal of contact 52, lead 61, contact 29, switch element 24, contact 34, and lead 62 to ground. When switch 22 is manipulated in the above described manner to cause switch elements 24, 25 and 26 to bridge the above-mentioned contacts, the foregoing circuit will be established to cause rotation of rotor shaft 63, which has a worm 63' formed at the outer end thereof in engagement with worm wheel 64, which is mounted on output shaft 14. This will cause worm wheel 64 to rotate in a counterclockwise direction as viewed in FIG. 2. Output shaft 14 is journaled in bearings 172 and 173 located in housing 174 of motor 13.

A one way clutch is operatively interposed between output shaft 14 and worm wheel 64. More specifically, this clutch consists of wedge-shaped apertures 65 circumferentially spaced about shaft 14, said apertures being located in the central portion of worm wheel 64. Cylindrical rollers 66 are located within apertures 65 and are biased toward the smaller portion of the wedge-shaped apertures 65, by springs 67. It will readily be appreciated that as worm wheel 64 is caused to rotate in a counterclockwise direction in FIG. 2, there will be a wedging action between the wall of apertures 65, at the smallest portions thereof, and shaft 14 through rollers 66 thereby causing output shaft 14 to rotate in a counterclockwise direction with worm wheel 64. The rotation of shaft 14 will be accompanied by a rotation of crank arm 15, which is keyed to shaft 14, and wipers 21 will thus be caused to oscillate back and forth across windshield 11 because of their connection to crank arm 15 through the mechanical linkage described above.

Figure 3:
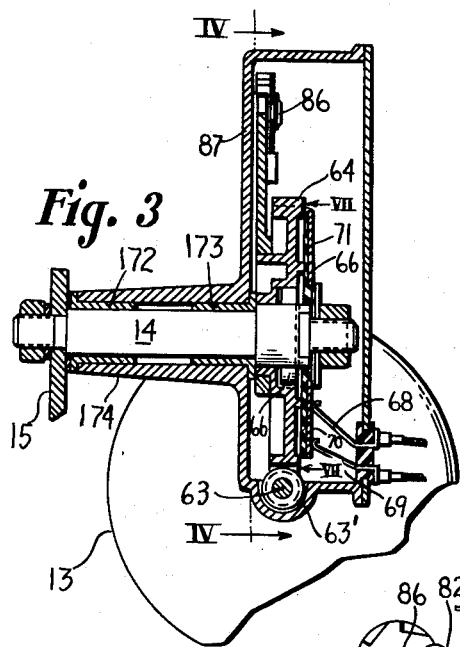
FIG. 3 is a view taken substantially along line III—III of FIG. 2 with certain portions of FIG. 2 being omitted in the interest of clarity.
Figure 7:
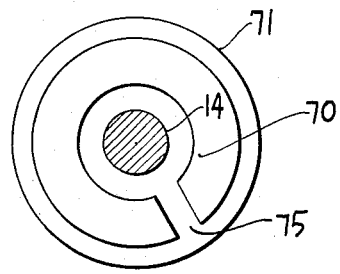
FIG. 7 is a view taken along line VII—VII of FIG. 3 with certain portions of FIG. 3 omitted in the interest of clarity.

When it is desired to terminate movement of wipers 21, it is merely necessary to manipulate a manual control 22' for the switch 22 to cause switch elements 24, 25 and 26 to return to the solid-line position in FIG. 6 wherein they bridge terminals 28–29, 30–31 and 32–33, respectively. If, during the foregoing manipulation, wipers 21 are at any position whatsoever which is removed from their normal parked position against the bottom molding of the windshield, the wiper motor 13 will continue to operate until such time as wipers 21 reach such position and thereafter motor 13 will automatically stop. The foregoing is achieved in the following manner: Assuming that wipers 21 are removed from their normal parked position, after switch elements 24, 25 and 26 have been placed in the above-described position, electrical contact wipers 68 and 69 (FIG. 3) will be electrically coupled to each other by conductive coating 70 on disk 71 which is mounted on output shaft 14. As it can be seen from FIG. 7, conductive coating 70 is not continuous and the only time that electrical contact wipers 68 and 69 will not be on conductive coating 70 is when wipers 21 are in their parked position, and at this time wipers 68 and 69 will be at nonconductive portion 75 on disc 71. Therefore assuming that wipers 21 are not in their parked position when switch elements 24, 25 and 26 are moved to their parking position, the following circuit will be maintained until such time as wipers 21 do reach their parked position: First of all, a circuit will be completed from lead 42 leading from battery 38, to lead 72, electrical contact wiper 68, conductive coating 70, electrical contact wiper 69, lead 44, field winding 45 and lead 46 to ground. Furthermore, a circuit will be completed through rotor or armature 55 of motor 13 from lead 44 through lead 43, contact 36, lead 47, contact 35, lead 73, contact 30, switch element 25, contact 31, lead 48, contact 58, lead 57, brush 56, armature 55, brush 54, lead 53, contact 52, lead 61, contact 29, switch elements 24, contact 28, lead 74 and lead 62 to ground. The foregoing circuit will be maintained through conductive coating 70 until such time as disk 71 reaches a position wherein electrical contact wipers 68 and 69 reach the non-conductive portion 75 of disk 71, at which time the above-described circuit to both field 45 and armature 55 will be broken, and the wiper motor 13 will stop with wipers 21 in their parked position proximate the lower molding of the windshield. It will of course be appreciated that if manual control 22' for switch 22 is manipulated to cause switch elements 24, 25 and 26 to move to a parked position when the wipers 21 are proximate the lower molding of the windshield, the above-described parking circuit will not operate because electrical contact wipers 68 and 69 will be located at non-conductive portion 75 of disk 71 and wipers 21 will stop immediately in their parked position without going through the above-described parking cycle.

When it is desired to cause wiper motor 13 to drive wipers 21 intermittently with an intervening dwell period between successive cycles of wiper movement, it is merely necessary to manipulate manual control 22' for switch 22 to cause switch elements 24, 25 and 26 to bridge contacts 34–76, 35–77, and 36–78, respectively. As a result, worm wheel 64 will rotate in a counterclockwise direction as described above, to drive wipers 21 and will also periodically rotate in a clockwise direction (FIG. 2), and during such clockwise rotation the one way clutch unit 65–66–67, described above, will permit worm wheel 64 to rotate without driving output shaft 14. During the disengagement between output shaft 14 and worm wheel 64, wipers 21 will remain in a parked position. Thus, in order to effect the intermittent operation described above, motor 13 is caused to rotate periodically in a first direction, and between successive cycles of rotation in said first direction, it is caused to rotate in a second direction which is opposite to said first direction.

Figure 4:
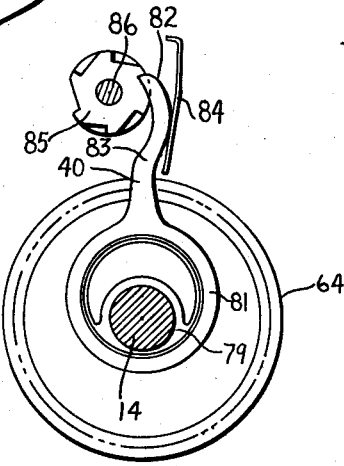
FIG. 4 is a view taken substantially along line IV—IV of FIG. 3 with certain portions of FIG. 3 omitted in the interest of clarity.

At this point, it is to be noted that eccentric 79, FIG. 4, is formed on the rear of worm wheel 64. A follower 80 includes a ring 81 encircling eccentric 79, and a pawl 82 is connected to ring 81 by neck portion 83. A leaf spring 84 bears against portion 83 to bias pawl 82 into engagement with ratchet 85 which is mounted for rotation on stub shaft 86 extending from the wall 87 of housing 74. It will readily be appreciated that whenever worm wheel 64 rotates, regardless of the direction, pawl 82 will move up and down, and because it is biased by spring 84 into engagement with ratchet 85, it will cause said ratchet to index each time that it does move upwardly. More specifically, since ratchet 85 has 6 points thereon, for each rotation of worm wheel 64, ratchet 85 will be caused to move one-sixth of its circumference. As can be seen from FIG. 5, a cam 88 is coaxially mounted on shaft 86 with ratchet 85. Cam 88 has a peripheral circular portion 89 and a cut-away portion 90. A cam follower 91 is formed from plate 92 which is mounted on lever 93 having an end portion 94 which is biased downwardly in FIG. 5 by spring 95 which extends between said end 94 and plate 96 which mounts reversing switch 50 on housing 74. When cam follower 91 is in the position shown in FIG. 5, that is on the circular portion 89 of cam 88, the left end of lever 93 will be biased downwardly against the bias of spring 95 and will cause contacts 52' and 58' which are mounted on spring arms 97 and 98, respectively, the outer ends of which are secured to plate 92, to be in electrical engagement with contacts 60 and 49, respectively, to thereby cause worm wheel 64 to rotate in a clockwise direction wherein it does not drive shaft 14 through clutch 65–66–67. More specifically, the following circuit is established when wiper motor is caused to drive worm wheel 64 in a clockwise direction. Lead 42 leading from battery 38 is in communication with ground through lead 99, contact 78, switch element 26, contact 36, lead 43, lead 44, field winding 45, and lead 46 thereby energizing the field winding 45. Also a circuit is established from contact 36, which is in communication with battery 38, through lead 47, contact 35, switch element 25, contact 77, lead 100, contact 58', contact 49, lead 51, contact 52, lead 53, brush 54, motor armature 55, bruh 56, lead 57, contact 58, lead 59, variable resistor 59a, movable contactor 59b, lead 59c, contact 60, contact 52', lead 102, contact 76, switch element 24, contact 34 and lead 62 to ground. It will be noted that the polarity at armature 55 of motor 13 is reverse to the polarity which exists during continuous wiper operation, and thus since the polarity is reversed, worm wheel 64 will rotate in a clockwise direction, rather than in a counterclockwise direction as was experienced during continuous wiper operation. During the clockwise rotation of worm wheel 64, ratchet 85 will be indexed every time that pawl 82 moves upwardly. The foregoing clockwise rotation of worm wheel 64 will continue as long as contacts 52' and 58' are in engagement with contacts 52 and 58 (FIG. 6), respectively, that is, while cam follower 91 rides on the circular peripheral portion 89 of cam 88. Furthermore, as noted above, whenever worm wheel 64 rotates in a clockwise direction shaft 14 will not be driven and thus wipers 21 will remain at rest against the bottom molding of the windshield.

The variable resistor 59a may be a rheostat of an operator adjustable type, if desired. Utilization of the resistor 59a causes the resistance to be inserted in the armature circuit of the motor only during clockwise rotation of the armature, thus providing a means for adjusting rotational speed of the motor during the dwell period and thereby providing a means for adjusting the duration of dwell in accordance with road, weather and traffic conditions. Increasing the resistance of resistor 59a thereby placing additional resistance in series with the armature decreases the speed of the motor, thus lengthening the period required to rotate the motor so that the cam follower 91 moves into the cut-away portion 90, thereby increasing the dwell period. It will, of course, be understood that in accordance with the broader aspects of the invention, the variable resistor 59a may be omitted. In this case, the dwell period will be fixed for any given system. However, a variable speed motor or a multispeed motor may be employed either with or without the rheostat 59a, in which case variation of the motor speed will result in variation of the duration of the dwell period as well as variation of wiper cycling frequency. Thus, if the speed of the motor is increased, wiper cycling frequency will be increased and the duration of dwell will be decreased and if the motor speed is decreased, the duration of dwell will be increased and the wiper cycling frequency will be decreased.

The foregoing dwell period will continue until such time as cam follower 91 falls into cut-away portion 90 of cam 88, as the latter rotates to the proper position to permit this. At this time, the left end of lever 93 will be caused to move upwardly because of the action of spring 95 so that contact 52' on spring arm 97 will engage contact 52 and contact 58' on spring arm 98 will engage contact 58. At this time motor 13 will be reversed because of a reversing of the polarity thereof, to thereby cause worm wheel 64 to rotate in a counterclockwise direction and thereby drive shaft 14 to cause wipers 21 to provide a cycle of wiper operation. More specifically, the field winding 45 of motor 13 is energized in the same manner as described above. However, spring arm 97 (FIG. 6) will move to close contacts 52' and 52 and spring arm 98 will move to close contacts 58 and 58. Thus a circuit will be established from lead 100, in communication with battery 38, through spring arm 98, contact 58', contact 58, lead 57, brush 56, armature 55, brush 54, lead 53, contact 52, contact 52', lead 102, contact 76, switch element 24, contact 34, and lead 62 to ground. Thus, the reversal of polarity to motor 13 resulting from the movement of spring arms 97 and 98 upwardly in FIG. 6 will cause the wiper motor 13 to drive worm wheel 64 in a counterclockwise direction to thereby drive shaft 14, and with the driving of shaft 14, to drive wipers 21 through a cycle of operation.

At the same time that wipers 21 return to their position proximate the lower molding of windshield 11 the action of pawl 82 on ratchet 85 will cause cam follower 91 to move downwardly and therefore re-establish engagement between contacts 52' and 60 and between contacts 58' and 49 because of the downward movement of spring arms 97 and 98 of switch 50 (FIG. 5). Thereafter all the while that cam follower 91 is on the circular peripheral portion 89 of cam 88, wipers 21 will remain in a position proximate the molding of windshield 11 until such time as cam follower 91 again falls into cutaway portion 90 on cam 88, whereupon another cycle of wiper movement will be obtained. In the foregoing manner successive cycles of wiper operation are obtained with intermittent periods of dwell between said successive cycles of operation. It will be appreciated that the cam and follower 88–91, and the ratchet and pawl mechanism 85–82 and the associated structure for operation, is in essence a timing mechanism for determining the periods of dwell between successive cycles of wiper operation.

Whenever it is desired to terminate wiper operation, whether it be continuous or intermittent, it is merely necessary to manipulate control 22' for the switch 22 so as to cause switch elements 24, 25 and 26 of switch 22 to return to their solid-line position shown in FIG. 6, to thereby cause the wipers 21 to be automatically moved to a parked position if they are not already in such position. It is to be especially noted that whenever the switch 22 is set to provide continuous operation, in the manner described above, the reversing circuits through switch 50 are completely bypassed so that the above-described action of switch 50 has no effect on the operation of wiper motor 13. It is only when switch 22 is set to provide intermittent operation, in the manner described above, that switch 50 does provide the circuits to cause the movement of motor 13 in opposite directions to either permit wipers 21 to rest in their normally parked position or to cause them to be driven to provide cycles of wiper operation.

Figure 8:
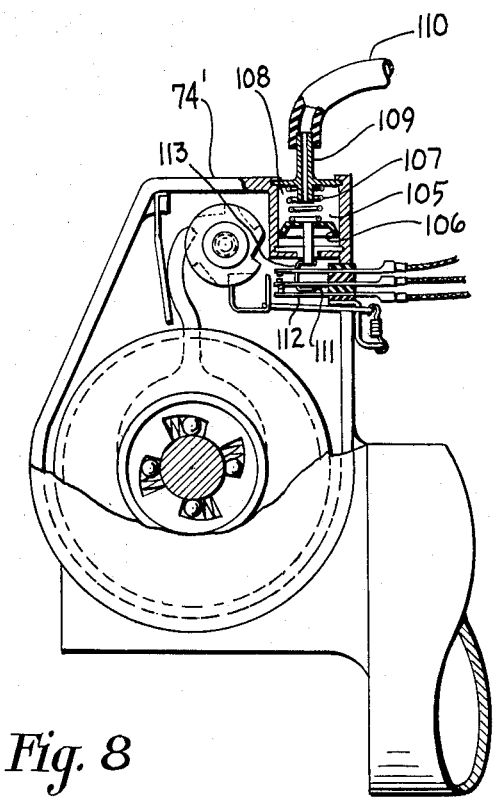
FIG. 8 is a fragmentary view of an alternate embodiment of the present invention.

In FIG. 8 a modified embodiment of the present invention is shown. This embodiment is the same as the above-described embodiment except for the structure to be described hereafter. In this embodiment there is an automatic shifting from intermittent to continuous operation in the event that the vehicle is accelerated, as in passing another vehicle, to thereby provide continuous wiper operation when the passing vehicle is subjected to increased amounts of wheel spray. More specifically, housing 74' includes a vacuum motor 105 incorporated therein having a piston 106 which is biased downwardly by spring 107. Whenever manifold vacuum is high, piston 106 will be pulled upwardly against bias of spring 107 because the vacuum can communicate with chamber 108 of motor 105 through nipple 109 and conduit 110 leading from the engine intake manifold. Whenever there is a drop in engine intake manifold vacuum, piston 106 will move downwardly and the lower end of member 111 will move spring arms 112 and 113 (FIG. 5) downwardly and the upper end 113' of member 111 will push the spring arms on which contacts 52 and 58 are mounted downwardly into engagement with contacts 52' and 58' to thereby cause worm wheel 64 to rotate in a counterclockwise direction wherein it drives shaft 14. The foregoing electrical circuit is maintained for as long as the manifold vacuum is relatively low, and when it returns to a normal value after acceleration has been completed piston 106 will again be moved upwardly against the bias of spring 107 to thereby cause switch 50 again to function in the above described manner to provide intermittent wiper operation.

It will be appreciated that the present invention is not limited to electric motor type of wiper motors, but can be utilized with any type of motor which is capable of providing rotation in opposite directions and that the motor may be of a multi-speed or a variable speed type.

It can thus be seen that the improved wiper motor of the present invention is manifestly capable of achieving the above enumerated objects and while preferred embodiments have been disclosed, it will readily be appreciated that the present invention is not limited thereto, but may be otherwise embodied.

What is claimed is:

1. A windshield wiper system for either providing continuous wiper operation or intermittent wiper operation with a dwell period between successive cycles of wiper movement comprising: a wiper, linkage means for driving said wiper, an electric wiper motor, a source of energy for said wiper motor, said electric wiper motor having an output shaft operatively coupled to said linkage means, first circuit means for causing said motor to be driven in a first direction, second circuit means for causing said motor to be driven in a second direction which is opposite to said first direction, clutch means for causing said output shaft to drive said linkage means when said motor is driven in said first direction and for causing said motor to run without driving said linkage means when said motor is driven in said second direction, and timing means operatively driven by said motor for periodically energizing said first circuit means to cause said motor to rotate in said first direction to provide said wiping cycle and for periodically energizing said second circuit means to cause said motor to rotate in said second direction to provide said dwell period between successive cycles of wiper operation, third circuit means for causing said wiper motor to run continuously, and switch means including first means for selectively energizing said third circuit means to provide continuous wiper operation, said switch means including second means for setting said wiper motor for intermittent operation by effecting periodic energizing of said first and second circuit means in conjunction with said timing means.

2. A windshield wiper motor for driving a windshield wiper linkage intermittently with intervening dwell periods between successive cycles of wiper movement comprising: a rotor, a rotor-driven shaft operatively associated with said rotor, an output shaft, one way clutch means operatively interposed between said rotor-driven shaft and said output shaft, first circuit means for selectively causing said motor to run in a first direction, second circuit means for selectively causing said motor to run in a second direction which is opposite to said first direction, and means operatively associated with said first and second circuit means for periodically energizing said first circuit means to cause said motor to run in said first direction to thereby drive said output shaft through said one way clutch means, said means also periodically energizing said second circuit means to cause said motor to run in said second direction to thereby cause said clutch means to cease transmitting motion from said rotor-driven shaft to said output shaft to thereby provide a dwell period between successive cycles of wiper movement.

3. A windshield wiper motor and linkage construction for driving a windshield wiper intermittently with intervening dwell periods between successive cycles of wiper movement comprising: first means for producing rotation, second means for providing a mechanical output from said motor, clutch means operatively interposed between said first and second means, first circuit means for causing said first means to rotate in a first direction, second circuit means for causing said first means to rotate in a second direction which is opposite to said first direction, and timing means for periodically alternately energizing said first and second circuit means to thereby cause said clutch means to transmit the movement from said first means to said second means when said motor is rotating in a first direction and for causing said clutch means to cease transmitting motion from said first means to said second means when said first means is rotating in said second direction to thereby cause said second means to produce said mechanical output intermittently.

4. A windshield wiper motor and circuit therefor comprising: first switch means having a first position for providing continuous wiper motor operation and a second position for providing intermittent wiper motor operation with an intervening dwell period between successive cycles of wiper movement, first circuit means for causing said wiper motor to rotate continuously in a first direction when said first switch means is in said first position, second switch means operatively associated with said motor, second circuit means intermittently energizable by said second switch means to cause said wiper motor to periodically operate in said first direction, third circuit means energizable by said second switch means between periods of energization of said second circuit means to cause said motor to rotate in a second direction which is opposite to such first direction, said second switch means being operative to intermittently energize said second and third circuit means when said first switch means is set in said second position to provide intermittent operation, and means for providing a mechanical output from said motor for driving a wiper only when said motor is rotating in said first direction.

5. A windshield wiper motor as set forth in claim 4 wherein said last mentioned means comprises one way clutch means operatively associated with said motor to cause said motor to produce an output for driving said wiper when said motor is rotating in said first direction, said one way clutch preventing said wiper motor from producing said output when said motor is rotating in said second direction.

6. A windshield wiper motor and a circuit therefor for providing a continuous mechanical output or an output having an intermittent movement with an intervening dwell period between successive cycles of movement comprising: first switch means for providing a continuous mechanical output or an intermittent output or for causing said wiper motor to move to a parking position, said wiper motor including first circuit means operative when said first switch means is in a position for continuous operation for causing said motor to provide continuous mechanical output, second switch means operatively associated with said wiper motor, second and third circuit means operatively associated with said second switch means, said second switch means causing said second circuit means to be periodically energized to thereby drive said wiper motor in a first direction, third circuit means operatively associated with said second switch means for causing said wiper motor to move in a second direction which is opposite to said first direction, one way clutch means operatively associated with said wiper motor for causing said wiper motor to produce said mechanical output when said wiper motor operates in said first direction but preventing said wiper motor from producing said mechanical output when said wiper motor operates in said second direction when said third circuit means are energized, said second switch means alternately energizing said second and third circuit means to thereby cause said wiper motor to produce successive cycles of mechanical output with intervening dwell periods between said successive cycles, and fourth circuit means operatively associated with said wiper motor for causing said wiper motor to operate in said first direction while said wipers are away from a parked position and while said first switch means are in a parking position.

7. A windshield wiper motor construction for producing a mechanical output either continuously or intermittently comprising: an electric motor, a rotor shaft in said motor, an output shaft on said motor, means for causing said rotor shaft to drive said output shaft when said electric motor is rotating in a first direction but preventing said motor shaft from driving said output shaft when said electric motor is rotating in a second direction which is opposite to said first direction, means operatively associated with said electric motor for alternately causing said electric motor to rotate in said first direction and in said second direction to thereby intermittently provide periods of mechanical output, and means operatively associated with said electric motor to cause said electric motor to rotate continuously in said first direction to thereby produce said mechanical output continuously.

8. A windshield wiper motor construction for producing a mechanical output either continuously or intermittently comprising: rotating motor means, a rotor shaft in said motor means, an output shaft on said motor means, means for causing said rotor shaft to drive said output shaft when said rotating motor means is rotating in a first direction but preventing said rotor shaft from driving said output shaft when said rotating motor means is rotating in a second direction which is opposite to said first direction, means operatively associated with said rotating motor means for alternately causing said rotating motor means to rotate in said first direction and in said second direction to thereby intermittently provide periods of mechanical output, and means operatively associated with said rotating motor means to cause said rotating motor means to rotate continuously in said first direction to thereby produce said mechanical output continuously.

9. A windshield wiper motor construction for producing a mechanical output intermittently comprising: an electric motor, a rotor shaft in said motor, an output shaft on said motor, means for causing said rotor shaft to drive said output shaft when said electric motor is rotating in a first direction but preventing said rotor shaft from driving said output shaft when said electric motor is rotating in a second direction which is opposite to said first direction, means operatively associated with said electric motor for alternately causing said electric motor to rotate in said first direction and in said second direction to thereby intermittently provide periods of mechanical output.

10. A windshield wiper motor for driving a windshield wiper continuously or for driving a windshield wiper intermittently with an intervening dwell period between successive cycles of wiper operation, comprising a reversible motor, first means for causing said motor to cycle said wiper when said wiper motor is operating in a first direction and second means for causing said wiper motor to have intervening dwell periods between said cycles of wiper operation when said wiper motor is operating in a second direction which is opposite to the said first direction.

11. Windshield wiper apparatus for driving a windshield wiper continuously or for driving a windshield wiper intermittently with an intervening dwell period between successive cycles of wiper operation, comprising a reversible motor and a wiper driven thereby, means for cycling said wiper when said motor is rotating in a first direction and for producing a dwell period when said motor is rotating in a second direction, motor reversing means for automatically reversing said motor, and motor speed control means for varying the speed of said motor and the duration of said dwell period when said motor is rotating in said second direction whereby the duration of dwell may be varied without changing the wiper cycling frequency.

12. Windshield wiper apparatus for driving a windshield wiper continuously or for driving a windshield wiper intermittently with an intervening dwell period between successive cycles of wiper operation, comprising a reversible motor, first means for causing said motor to cycle said wiper when said wiper motor is operating in a first direction, second means for causing said wiper motor to have intervening dwell periods between said cycles of wiper operation when said wiper motor is operating in a second direction which is opposite to said first direction and third means for operator controlled variation of the duration of said intervening dwell periods.

References Cited in the file of this patent
UNITED STATES PATENTS 2,987,747    Oishei _____ June 13, 1961
3,091,792    Gute _____ June 4, 1963